US011860034B2

(12) United States Patent
Ritter

(10) Patent No.: US 11,860,034 B2
(45) Date of Patent: Jan. 2, 2024

(54) SYSTEMS, DEVICES, AND METHODS FOR HYPERSPECTRAL IMAGING

(71) Applicant: Raytheon BBN Technologies, Corp., Cambridge, MA (US)

(72) Inventor: Scott Ritter, Sudbury, MA (US)

(73) Assignee: Raytheon BBN Technologies, Corp., Cambridge, MA (US)

( * ) Notice: Subject to any disclaimer, the term of this patent is extended or adjusted under 35 U.S.C. 154(b) by 255 days.

(21) Appl. No.: 17/233,225

(22) Filed: Apr. 16, 2021

(65) Prior Publication Data

US 2021/0348966 A1 Nov. 11, 2021

Related U.S. Application Data

(60) Provisional application No. 63/022,347, filed on May 8, 2020.

(51) Int. Cl.
*G01J 3/02* (2006.01)
*G01J 3/28* (2006.01)

(52) U.S. Cl.
CPC ........... *G01J 3/0248* (2013.01); *G01J 3/2823* (2013.01)

(58) Field of Classification Search
CPC .................. G01J 2003/2826; G01J 3/2823
See application file for complete search history.

(56) References Cited

FOREIGN PATENT DOCUMENTS

CN 111164395 A * 5/2020 ............ G01J 3/0208

OTHER PUBLICATIONS

Steven Rogers, "Automatic target recognition using neural networks", Photonics, 1995 (Year: 1995).*
Manuel Vázquez-Arellano, "3-D Imaging Systems for Agricultural Applications—A Review", (Year: 2016)*
Suren, "Reconstructing Intensity Images from Binary Spatial Gradient Cameras", 2017 (Year: 2017).*
Bakhtiar B. Litkouhi, Imaging sensor technology for intelligent vehicle active safety and driver assistant systems, 2012, (Year: 2012).*
Yang Feng, Event Density Based Denoising Method for Dynamic Vision Sensor, Mar. 16, 2020, (Year: 2020).*
Steven Rogers, "Automatic target recognition using neural networks", 1995 (Year: 1995).*

(Continued)

*Primary Examiner* — Maurice C Smith

(57) ABSTRACT

A technology is described for hyperspectral imaging. An example of the technology can include receiving an event stream of events from an event camera coupled to an interferometer. The event camera can receive light output from the interferometer and generate the event stream, comprising event data that corresponds to the light output. The events in the event stream can indicate a pixel that detected an event, a time of the event, and a polarity of change in brightness detected by the pixel. Spectral data can be generated for the events in the event stream using a demodulation and frequency transform to convert temporospatial aggregates of events in the event stream to frequency domain data that corresponds to an optical spectrum. A hyperspectral image of an input scene in a spectral range can be generated using the spectral data.

25 Claims, 4 Drawing Sheets

(56) References Cited

OTHER PUBLICATIONS

Afshar et al., Investigation of Event-Based Surfaces for High-Speed Detection, Unsupervised Feature Extraction, and Object Recognition, Frontiers in Neuroscience, Jan. 2019, 19 pages, vol. 12, Article 1047, Frontier Media SA, Switzerland.

Camunas-Mesa et al., On the use of orientation filters for 3D reconstruction in event-driven stereo vision, Frontiers in Neuroscience, Mar. 2014, 17 pages, vol. 8, Article 48, Frontier Media SA, Switzerland.

Carneiro et al., Event-based 3D reconstruction from neuromorphic retinas, Neural Networks, 2013, pp. 27-38, vol. 45, Elsevier, Amsterdam.

Cohen et al., Event-based Sensing for Space Situational Awareness, 2019, The Journal of the Astronautical Sciences, 13 pages, Advanced Maui Optical and Space Surveillance (AMOS) Technologies Conference, Kihei, Hawaii.

Farley et al., Development and testing of a hyperspectral imaging instrument for field spectroscopy, Imaging Spectrometry X, Oct. 15, 2004, p. 29-36, Proceeding of SPIE vol. 5546.

Farley et al., Performance of the FIRST, a Longwave Infrared Hyperspectral Imaging Sensor, Proceedings of SPIE—The International Society for Optical Engineering, Sep. 12, 2006, 11 pages, #6398, Sweden.

Gallego et al., Event-based Vision: A Survey, IEEE Transactions on Pattern Analysis and Machine Intelligence, Jul. 10, 2020, 30 pages, Institute of Electrical and Electronics Engineers, Piscataway, New Jersey.

Glumb et al., A Constellation of Fourier Transform Spectrometer (FTS) CubeSats for Global Measurements of Three-Dimensional Winds, 29th AIAA/USU Conference on Small Satellites, Aug. 8-13, 2015, pp. 1-7, Logan, Utah.

Lagueux et al., Performance of a Cryogenic Michelson Interferometer, Proceedings of SPIE—Ther International Society for Optical Engineering, Jul. 2008, 12 pages, vol. 7082.

Osswald et al., A spiking neural network model of 3D perception for event-based neuromorphic stereo vision systems, Scientific Reports, Jan. 12, 2017, 12 pages, Nature Portfolio, Germany.

Perri et al., Hyperspectral imaging with a TWINS birefringent interferometer, Optics Express, May 21, 2019, pp. 15956-15967, vol. 27, No. 11, OSA Publishing, Washington, D.C.

Posch et al., A Qvga 143 dB Dynamic Range Frame-Free PWM Image Sensor With Lossless Pixel-Level Video Compression and Time-Domain CDS, *IEEE Journal of Solid-State Circuits*, Jan. 2011, pp. 259-275, vol. 46, No. 1, Institute of Electrical and Electronics Engineers, Piscataway, New Jersey.

Preda et al., Linear and nonlinear spectroscopy by a common-path birefringent interferometer, *IEEE Journal of Selected Topics in Quantum Electronics*, May-Jun. 2017, pp. 1-9, vol. 23, No. 3, Institute of Electrical and Electronics Engineers, Piscataway, New Jersey.

\* cited by examiner

SYSTEMS, DEVICES, AND METHODS FOR HYPERSPECTRAL IMAGING

RELATED APPLICATIONS

This application claims the benefit of U.S. Provisional Patent Application Ser. No. 63/022,347, filed May 8, 2020, entitled, "Invisible Headlights" which is incorporated by reference in its entirety herein.

BACKGROUND

Spectral imaging, also known as imaging spectroscopy, refers to a set of methods and devices for acquiring a light spectrum for each point in an image of an input scene (e.g., light input from an environment that is being imaged). One of these methods is hyperspectral imaging (HIS), which obtains the electromagnetic spectrum for each pixel in an image to enable identification of objects, identifying materials, or detecting processes. HSI is a powerful technique for a wide range of fundamental and applied studies in fields as diverse as remote sensing, medical imaging, agriculture, coastal and geological prospecting, safety and security, archaeology, conservation science, and other fields. HSI has been implemented in a wide variety of methods, including combining a monochrome imaging camera with a Fourier transform (FT) spectrometer. In FT spectroscopy, an optical waveform is split into two collinear delayed replicas, whose interference pattern is measured by a detector as a function of their delay. The FT of the resulting interferogram yields a continuous intensity spectrum of the waveform, providing the electromagnetic spectrum of a point in an input scene.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
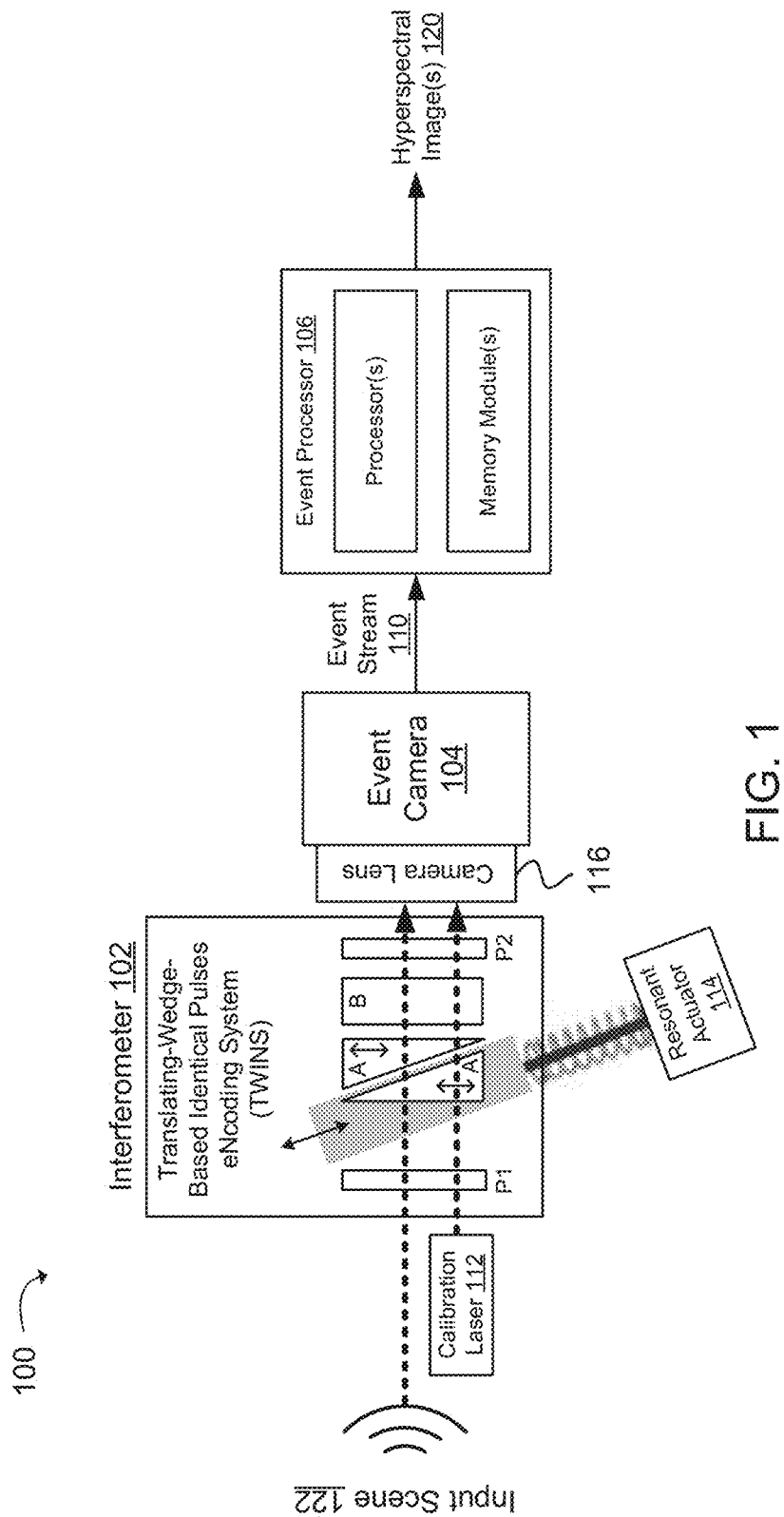
FIG. 1 is a block diagram illustrating an example an example hyperspectral imaging system to generate hyperspectral images, in accordance with an example of the technology.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology, nor is it intended to limit the scope of the claimed subject matter.

Technologies are described for hyperspectral imaging using an interferometer and an event camera. In one example, an interferometer can be coupled to an event camera to allow light output from the interferometer to be provided to the event camera. The event camera generates an event stream of events that correspond to the light output of the interferometer. The event data included in the event stream can be transformed to spectral data which can be used to generate a hyperspectral image that reconstructs an input scene captured by the interferometer and event camera into a visible and/or non-visible (e.g., infrared (IR) and ultraviolet (UV)) spectral range(s). The resulting hyperspectral image can be provided to other systems which can use the hyperspectral image for various purposes. As an example, a stream of hyperspectral image frames can be sent to downstream vision processing systems for use in nighttime vehicle navigation.

The technologies can use various interferometer types to provide light output to the event camera. Interferometers can be used to measure small displacements, refractive index changes, and surface irregularities of ambient objects included in an input scene. Illustratively, interferometers split light from an input source into two beams of light that travel in different optical paths, which are then combined again to produce interference, which provides information about the difference in optical path lengths. In Fourier transform spectroscopy, an interferometer can be used to analyze light to determine features of absorption or emission associated with an ambient environment. In one example, an interferometer can comprise a translating wedge based identical pulses encoding system (TWINS) that has a configurable sweep actuation mechanism, which is described in greater detail later.

Light output from the interferometer can be provided to an event camera. The event camera includes an array of pixels configured to independently detect an event (change in brightness) associated with the light output of the interferometer and independently generate event data in response to the light output. The event data can comprise a discrete packet of information (e.g., a data packet or message) containing a pixel address of the pixel that detected the event, a sign (or value) of change in illumination (brightness), and a timestamp. The event data can be aggregated into an event stream which can be provided to an event processor configured to generate spectral data for the events represented in the event stream. The event processor may determine frequency components for a group of events using a demodulation and frequency transform technique that aggregates and processes the events to extract frequency information (spectral data) which can be used to generate a hyperspectral image that reconstructs an input scene captured by the interferometer in a visible and/or nonvisible spectral range. For example, because a single event simply includes a pixel location or region, timestamp, and sign, the single event alone does not indicate frequency information. Thus, a local cluster (temporospatial) of events in the event stream can be aggregated and processed to extract frequency information used to generate a hyperspectral image.

To further describe the present technology, examples are now provided with reference to the figures. FIG. 1 is a block diagram illustrating an example hyperspectral imaging system 100 comprising an interferometer 102 coupled to an event camera 104 that outputs an event stream 110 to an event processor 106 configured to generate hyperspectral images 120.

As illustrated, the interferometer 102 captures light from an input scene 122 and outputs the light to the event camera 104. In one example, the interferometer 102 can comprise a translating wedge based identical pulses encoding system (TWINS) configured with a resonant actuator 114 to produce an increased or high sweep rate. For example, the resonant actuator 114 can be used as a configurable sweep actuation mechanism for which the throw, dwell, etc. can be parametrically controlled via resonant actuator 114 input to emphasize or deemphasize certain spectral bands. The interferometer 102 can include birefringent blocks (shown as A and B) which can be α-barium borate (α-BBO) or another suitable material, and wire grid polarizers P1 and P2 which, for example, can have an extinction ratio >5000 at wavelengths from 400 nm to 2 μm. The polarizer 124$a$ can polarize light input from an input scene 122 at 45° with respect to the optical axes of birefringent blocks A and B. As a non-limiting example, birefringent block B can be a plate with a thickness L=2.4 mm and aperture diameter D=5 mm. Birefringent block B can introduce a fixed phase delay between the two orthogonal polarizations that propagate along the fast and slow axes of the material. Birefringent A can have optical axis orthogonal to that of birefringent block B to apply a delay with opposite sign. The overall phase delay introduced by the TWINS ranges from positive to negative values according to the relative thickness of the birefringent blocks A and B. To enable fine tuning of the phase delay, birefringent block A can be shaped in the form of two wedges with the same apex angle (e.g., 7°), one of which is mounted on a motorized translation stage implemented using the resonant actuator 114. In one example, travel range of the motorized translation state can be set to a maximum of 13 mm. The grid polarizer P2 can be set at 45° with respect to the optical axes of birefringent blocks A and B and project the two interference fields from the birefringent blocks A and B to the same polarization. The spectral resolution of the interferometer 102 is inversely proportional to the total phase delay. For example, scanning the position of the wedges ±1 mm around the zero path delay (ZPD) introduces a delay of ±50 fs to the birefringent block A replicas of a wave at λ=600 nm, which corresponds to spectral resolution of 15 THz (~18 nm). Although FIG. 1 shows the interferometer 102 as being implemented using a TWINS, it will be appreciated that the hyperspectral imaging system 100 can be implemented using other types of interferometers configured to output light from an input scene to the event camera 104.

The event camera 104 (also referred to as a neuromorphic camera, or silicon retina, or dynamic vision sensor) is an imaging sensor that responds to local changes in brightness. In contrast to most conventional cameras, an event camera 104 does not capture images using a camera shutter. Instead, each pixel in a pixel array of the event camera 104 operates independently and asynchronously, each reporting changes in brightness as they occur (referred to herein as an "event").

For example, each pixel stores a reference brightness level (e.g., a preset threshold), and continuously compares the reference brightness level to a current level of brightness. If a difference in brightness exceeds the reference brightness level, the pixel resets the reference brightness level and generates an indication of the event, which can comprise a data packet of information or message containing the pixel's address (e.g., x, y, or other spatial coordinates in the pixel array), a timestamp indicating a time of the event (i.e., a time that the event occurred), and a value representing a change in brightness detected by the pixel (e.g., a polarity (increase or decrease) of a brightness change, or a measurement of a current level of illumination). Accordingly, the event camera 104 can provide a focal plane array (FPA) sensitivity, dynamic range, and an effective frame rate to enable Fourier Transform spectroscopy for scenes in motion.

Light output from the interferometer 102 can be directed to a camera lens 116 or coupling optics which is disposed in the hyperspectral imaging system 100 to focus the light output from the interferometer 102 onto the pixel array of the event camera 104. The event camera 104 outputs an asynchronous event stream 110 triggered by changes in scene illumination individually and independently detected by the pixels in the pixel array (e.g., a serial stream of asynchronous events). The event stream 110 contains event data (e.g., data packets, messages, etc.) asynchronously generated by one or more of the pixels of the event camera 104. The events in the event stream 110 identify a location or region of the pixel that detected an event in the pixel array (e.g., an x, y coordinate), a time of the event, and a change in brightness detected by the pixel.

As described in greater detail below in association with FIG. 2, the event processor 106 receives the event stream 110 from the event camera 104 and generates spectral data for temporospatial aggregates of events in the event stream 110 using a demodulation and frequency transform technique (e.g., digital demodulation and discrete cosine transform (DOT)). For example, demodulation can be used to convert the temporospatial aggregates of events in the event stream 110 from a pixel-region of the interferometer 102 into an equivalent time-varying signal (a sequence of amplitude values in a time domain) for input to the DOT. In one example, a non-uniform discrete cosine transform (NDCT) can be used to compensate for the non-linear sweep of the resonant actuator 114. The NDCT is a time domain data to frequency domain data transformation. The frequency domain data output by the NDCT describes the magnitudes of frequency components of the time domain data. Based on physical parameters of the interferometer 102, each frequency component represents (e.g., maps to) an optical wavelength (spectral component). However, the actual frequencies of the frequency components are much lower than the optical frequencies they represent. Accordingly, for each temporospatial aggregate of events, the demodulation and frequency transform technique outputs frequency domain data that may be a relatively low-frequency spectrum (e.g., in the kilohertz band) that corresponds to an optical frequency spectrum (in the terahertz band). Therefore, spectral data for a temporospatial aggregate of events corresponds to the optical spectrum for that temporospatial aggregate of events, and the spectra of all pixel-regions of the interferometer 102 can be combined to generate a hyperspectral image The event processor 106 can generate a hyperspectral image using the spectral data to reconstruct the input scene 122 in a visible and/or non-visible spectral range. For a moving input scene, pixel-sized points in the output hyperspectral image correspond to temporospatial regions of pixels which translate with relative motion between the hyperspectral imaging system 100 and input scene 122. That is, for a moving input scene, pixel-sized points on the image do not correspond to single pixels on the focal plane array (FPA) of the hyperspectral imaging system 100; rather, as said above, the pixel-sized points correspond to temporospatial regions of pixels which translate with relative motion between the hyperspectral imaging system 100 and the input scene 122.

In one example, the hyperspectral imaging system 100 can include a calibration laser 112, which can provide a calibration source of a known wavelength used to perform spectral calibration of the spectral data generated by the event processor 106. The calibration laser 112 can be disposed in a fixed location of the hyperspectral imaging system 100, such that light from the calibration laser 112 can be introduced into the interferometer in parallel with light from the input scene 122 and directed to one or more dedicated pixels in the pixel array. The locations of the dedicated pixels can be provided as a static variable (e.g., calibration pixel variable) to the event processor 106. The event camera 104 can generate events from light of the calibration laser 112 and these events can be included in the event stream 110. The event processor 106 can identify the events generated by the calibration laser 112 by correlating the pixel locations of the events in the pixel array to the locations specified in the static variable (e.g., calibration pixel variable) containing the pixel locations. The event processor 106 can generate frequency domain data for the events generated by the calibration laser 112, and the frequency domain data can be used for spectral calibration of temporospatial aggregate of events associated with the input scene 122.

The event processor 106 may be a computing device that includes a processor or processing device, such as a microprocessor, an embedded processor, a digital signal processor (DSP), a network processor, a handheld processor, an application processor, a co-processor, a system on a chip (SOC), or other device to execute code. The computing device may also include one or more memory modules, such as RAM, ROM, EEPROM, flash memory or other memory technology, or any other computer storage medium. While FIG. 1 illustrates an example of a system that may implement the techniques above, many other similar or different system environments are possible. The example system environments discussed and illustrated herein are merely representative and not limiting, as will be apparent to those skilled in the art.

Figure 2:
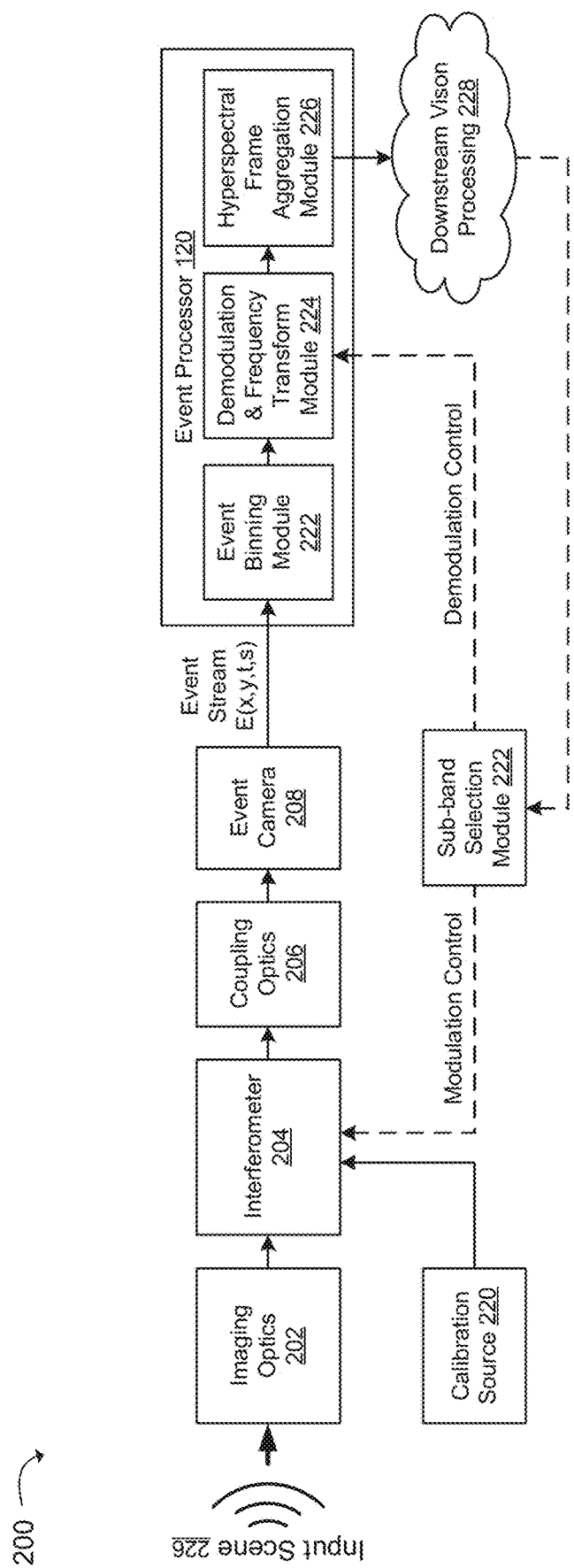
FIG. 2 is a block diagram that illustrates an example system and method for hyperspectral imaging, in accordance with an example of the technology.

FIG. 2 is a block diagram that illustrates an example system 200 and method for hyperspectral imaging using an interferometer 204, an event camera 208, and an event processor 220. The system 200 can be implemented using the system components described above in association with FIG. 1. The system 200 can include imaging optics 202 configured to capture light from an input scene 226 (e.g., light from an ambient environment) and the light can be focused by the imaging optics 202 onto the interferometer 204. As shown in FIG. 1, the interferometer 204 can be implemented using a TWINS with a configurable sweep actuation mechanism (e.g., a resonant actuator) for which a throw, dwell, etc. can all be parametrically controlled via a modulation control input to emphasize or deemphasize certain spectral bands. The sweep rate of the interferometer 204 may be sufficiently faster than a rate of change of the input scene 226 so that one or more sweeps can occur without substantial variation in the input scene 226.

Output of the interferometer 204 may be a version of the input scene 226 in which the intensity of each region varies uniquely and periodically in accordance with the region's spectral content and the sweep rate. A calibration source 220 (e.g., a laser or other stable narrowband emitter) of a known wavelength can be introduced into the interferometer 204 in parallel with light from the input scene 226 onto a small dedicated region of an aperture of the interferometer 204 to enable subsequent spectral calibration of spectral data generated from the light output of the interferometer 204.

The light output of the interferometer 204 can be focused by coupling optics 206 (e.g., a camera lens) onto a pixel array sensor of the event camera 208. The event camera 208 can produce a corresponding digital event stream of event data, with each event (E(x,y,t,s)) describing an originating pixel location (x,y), time (t), and sign (s) of change in illumination which caused the event to occur.

The event stream may be processed by an event processor 120 comprising a computational system (e.g., a compute device) that numerically and temporally manipulates the event data in the event stream. In one example, the event processor 120 executes an event binning module 222 configured to perform event binning comprising collecting events in the event stream according to the temporospatial neighboring time intervals and pixel location x,y) origins of the events.

The event processor 120 can then execute a demodulation and frequency transform module 224 configured to perform digital demodulation and transform the binned events into frequency domains. In one example, the demodulation and frequency transform module 224 performs a non-uniform discrete cosine transform (NDCT) to transform the binned events into frequency domains. In one example, to reduce processing bandwidth, the most salient spectral components of the input scene 226 can be identified using a demodulation control input, and the events in these specific frequency bands can be transformed. For example, the demodulation control relays particular sub-bands which have been selected (by an operator, etc.) for enhancement. The sub-bands are enhanced by applying corresponding modulation control waveforms to the resonant actuator 114 shown in FIG. 1. For example, the modulation control waveforms may cause the resonant actuator 114 to actuate the interferometer 102 travel over constrained intervals. Namely, the modulation control drives waveforms into the resonant actuator 114, which in turn actuates the other interferometer components to control the parameters (rate, throw, etc.) of the interferometer 102. The frequencies in the enhanced sub-bands contain the data of interest, such that only these frequencies need to be demodulated. As such, in the case of using a DOT, only the DOT for a frequency within the enhanced sub-band need be computed. A DOT for a frequency that is outside of the sub-band can be skipped to save time, power, etc.

The demodulation control input may be coordinated by a sub-band selection module 222 configured to select the same spectral bands emphasized by the modulation control input. For example, the modulation control input can control an overall sweep rate of the interferometer 102, and can also control throw and travel rates of the interferometer 102 at various positions along the throw during individual cycles. As an example, for a higher-frequency sub-band, the modulation control input can shorten the throw rate of the resonant actuator 114 of the interferometer 204. The use of an NDCT may compensate for any nonlinear characteristics of the sweep rate of the interferometer 204. For example, to optimize power or speed, the sweep rate may be sinusoidal rather than linear and drive the interferometer 204 at some resonant frequency.

Output from the demodulation and frequency transform module 224 can be a collection of temporally-varying per-pixel spectral data. The spectral data can be input to a hyperspectral frame aggregation module 226 which may be configured to integrate the spectral data over uniform intervals into a sequence of successive (image and/or video) frames where each frame includes the magnitudes of the (sub-band-selected) spectral components for every pixel in the input scene 226. In one example, the resulting hyperspectral image or video stream can be passed to external downstream data processors which analyze the hyperspectral image or video for various purposes, such as downstream vision processing 228 for low-light vehicle navigation. In one example, one or more of these external downstream data processors may determine certain spectral bands to be more salient or more noisy than others, and subsequently issue commands back to the sub-band selection module 222 to dynamically adjust the sweep rate of the interferometer 204, as well as control the throw and travel rates of the interferometer 204 at various positions along the throw during individual cycles. The commands issued by the external downstream data processor can accentuate the more salient spectral bands and/or attenuate the more noisy spectral bands, thereby improving contextual performance.

Figure 3:
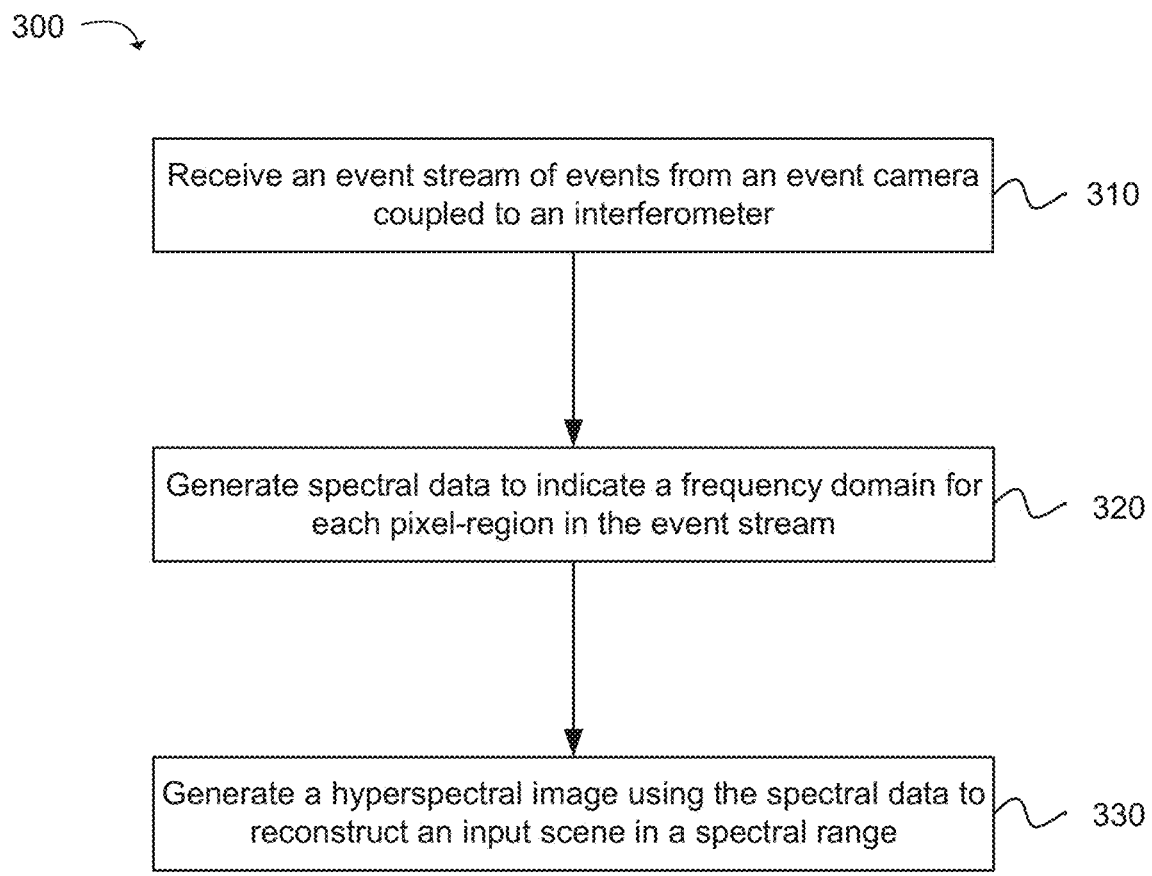
FIG. 3 is a flow diagram illustrating an example method for hyperspectral imaging, wherein spectral data is extracted for each temporospatial aggregate of events in an event stream, in accordance with an example of the technology.

FIG. 3 is a flow diagram illustrating an example method 300 for hyperspectral imaging. As in block 310, the method 300 can include receiving an event stream of events from an event camera. The event camera can be coupled to an interferometer as described earlier, and the event camera may receive light output from the interferometer and generate the event stream, which comprises event data that corresponds to the light output. An event in the event stream can indicate a pixel in a pixel array that detected the event, a time of the event, and a change in brightness detected by the pixel. In one example, the interferometer can be implemented using a translating wedge based identical pulses encoding system (TWINS) having a configurable sweep actuation mechanism, as described earlier. The configurable sweep actuation mechanism can be parametrically controlled by a modulation control input to emphasize or deemphasize certain spectral bands. Also, a sweep rate of the interferometer can be configured to be greater than a rate of change of the input scene.

As in block 320, spectral data can be generated. The spectral data may indicate optical spectrums corresponding to frequency domain data for each pixel-region in the event stream. The frequency domain data for a pixel-region can be determined using a demodulation and frequency transform technique which converts the time domain data of temporospatial aggregates of events in the event stream to frequency domain data, which describes the magnitudes of frequency components of the time domain data of the temporospatial aggregates of events. The frequency domain data corresponds to an optical spectrum, and the spectral data can be generated by mapping the frequency domain data to the optical spectrum. The method 300 can aggregate the events by grouping the events in the event stream into a plurality of event bins. The events can be grouped in event bins based in part on a time of detection and location of the pixels in the pixel array that detected the events, forming temporospatial aggregates of events, and the demodulation and frequency transform technique can be used to generate the spectral data as described above.

In one example, the demodulation and frequency transform technique can include a non-uniform discrete cosine transform (NDCT). However, as will be appreciated, another appropriate type of frequency transform (e.g., a non-uniform fast Fourier transform (NFFT), which may be more efficient for densely-populated sub-bands) can be used. For example, in some contexts, the full bandwidth of an event can be transformed into frequency domain data to provide better contrast and better edge visibility of an input scene. In one example, as described earlier, spectral calibration of the spectral data can be performed using a calibration source of a known wavelength, such that the calibration source is input to the interferometer and provided in the light output to the event camera.

As in block 330, a hyperspectral image can be generated using the spectral data to reconstruct an input scene in a visible and/or non-visible spectral range. In one example, the hyperspectral image can included in a video stream that can be provided to a down-stream vision processing system, which can provide commands to accentuate or attenuate certain spectral bands.

Figure 4:
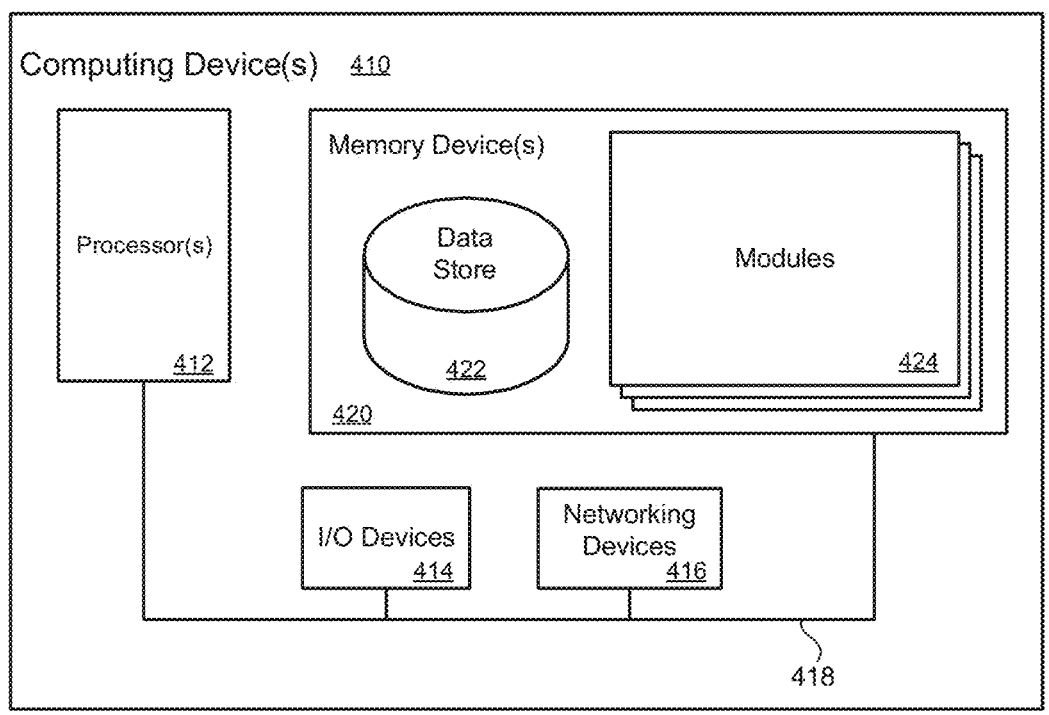
FIG. 4 is a block diagram illustrating an example of a computing device that may be used to execute the methods described herein.

FIG. 4 illustrates a computing device 410 on which modules of this technology can execute. The computing device 410 illustrated is a high-level example of a device on which the present technology can be executed. The computing device 410 can include one or more processors 412 that are in communication with one or more memory devices 420. In one example, the computing device 410 can be a field-programmable gate array (FPGA) which is programmed to execute the methods described herein. The computing device 410 can include a local communication interface 418 for the components in the computing device 410, For example, the local communication interface 418 can be a local data bus and/or any related address or control busses as may be desired.

The memory device 420 can contain modules 424 that are executable by the processor(s) 412 and data for the modules 424. In one example, the memory device 420 can include an event binning module, a demodulation and frequency transform module, a hyperspectral frame aggregation module, and other modules, In one example, one or more modules can be executed in parallel. The modules 424 can execute the functions described earlier. A data store 422 can also be located in the memory device 420 for storing data related to the modules 424 and other applications along with an operating system that is executable by the processor(s) 412.

Other applications can also be stored in the memory device 420 and may be executable by the processor(s) 412. Components or modules discussed in this description that can be implemented in the form of software using high-level programming languages that are compiled, interpreted, or executed using a hybrid of the methods described herein.

In some examples, the computing device 410 can have access to I/O (input/output) devices 414 that are usable by the computing device 410 to communicate with other computing devices (e.g., downstream vision processing systems). Networking devices 414 and similar communication devices can be included in the computing device 410. The networking devices 416 can be wired or wireless networking devices that connect to a LAN, WAN, or other computing network.

The components or modules that are shown as being stored in the memory device 420 can be executed by the processor(s) 412. The term "executable" can mean a program file that is in a form that can be executed by a processor 412. For example, a program in a higher level language can be compiled into machine code in a format that can be loaded into a random access portion of the memory device 420 and executed by the processor 412, or source code can be loaded by another executable program and interpreted to generate instructions in a random access portion of the memory to be executed by a processor. The executable program can be stored in any portion or component of the memory device 420. For example, the memory device 420 can be random access memory (RAM), read only memory ROM), flash memory, a solid state drive, memory card, a hard drive, or any other type of memory component.

The processor 412 can represent multiple processors and the memory device 420 can represent multiple memory units that operate in parallel to the processing circuits. This can provide parallel processing channels for the processes and data in the system. The local communication interface 418 can be used as a network to facilitate communication between any of the multiple processors and multiple memories, The local communication interface 418 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared, and other ireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for hyperspectral imaging, comprising:
an interferometer coupled to an event camera, wherein light output from the interferometer is provided to the event camera which generates an event stream of events that correspond to the light output,
wherein the event camera has a pixel array comprising a plurality of pixels configured to independently detect an event representative of a change in brightness, and to independently generate an indication of the event in response to detecting the event;
at least one processor;
a memory device including instructions that, when executed by the at least one processor, cause the system to:
receive the event stream from the event camera, wherein an event in the event stream indicates a pixel that detected an event, a time of the event, and a change in brightness detected by the pixel;

generate spectral data for the events in the event stream using a demodulation and frequency transform to convert temporospatial aggregates of events in the event stream to frequency domain data that corresponds to an optical spectrum; and generate a hyperspectral image using the spectral data to reconstruct an input scene in a spectral range.

2. The system in claim 1, wherein the memory device further includes instructions that, when executed by the at least one processor, cause the system to group the temporospatial aggregates of events in the event stream into a plurality of event bins.

3. The system in claim 2, wherein the memory device further includes instructions that, when executed by the at least one processor, cause the system to determine frequency domain data for the events in the event bins using the demodulation and frequency transform technique.

4. The system in claim 2, wherein the demodulation and frequency transform technique includes performing a Non-uniform Discrete Cosine Transform (NDCT).

5. The system in claim 1, wherein the interferometer is implemented using a translating wedge based identical pulses encoding system (TWINS) having a configurable sweep actuation mechanism.

6. The system in claim 5, wherein the configurable sweep actuation mechanism is parametrically controlled by a modulation control input to emphasize or deemphasize certain spectral bands.

7. The system in claim 5, wherein a sweep rate of the interferometer is greater than a rate of change of the input scene.

8. The system in claim 1, further comprising coupling optics disposed to focus the light output from the interferometer onto the pixel array of the event camera.

9. The system in claim 1, wherein the memory device further includes instructions that, when executed by the at least one processor, cause the system to perform spectral calibration of the spectral data using a calibration source of a known wavelength, wherein the calibration source is input to the interferometer and provided in the light output to the event camera.

10. A computer implemented method for hyperspectral imaging, comprising:

receiving an event stream of events from an event camera, wherein the event camera is coupled to an interferometer, and the event camera receives light output from the interferometer and generates the event stream comprising event data that corresponds to the light output, wherein the events in the event stream indicate a pixel that detected an event, a time of the event, and a polarity of change in brightness detected by the pixel;

generating spectral data for the events in the event stream using a demodulation and frequency transform to convert temporospatial aggregates of events in the event stream to frequency domain data that corresponds to an optical spectrum; and generating a hyperspectral image using the spectral data to reconstruct an input scene in a spectral range.

11. The method in claim 10, further comprising grouping the events in the event stream into a plurality of event bins.

12. The method in claim 11, further comprising determining frequency domain data for the events in the event bins using the demodulation and frequency transform technique.

13. The method in claim 11, wherein the demodulation and frequency transform technique includes performing a Non-uniform Discrete Cosine Transform (NDCT).

14. The method in claim 10, wherein the interferometer is implemented using a translating wedge based identical pulses encoding system (PA/INS) having a configurable sweep actuation mechanism.

15. The method in claim 14, wherein the configurable sweep actuation mechanism is parametrically controlled by a modulation control input to emphasize or deemphasize certain spectral bands.

16. The method in claim 14, wherein a sweep rate of the interferometer is greater than a rate of change of the input scene.

17. The method in claim 10, performing spectral calibration of the spectral data using a calibration source of a known wavelength, wherein the calibration source is input to the interferometer and provided in the light output to the event camera.

18. A non-transitory machine readable storage medium including instructions embodied thereon, wherein the instructions, when executed by at least one processor:

receive an event stream of events from an event camera, wherein the event camera is coupled to an interferometer, and the event camera receives light output from the interferometer and generates the event stream comprising event data that corresponds to the light output, wherein the events in the event stream indicate a pixel that detected an event, a time of the event, and a change in brightness detected by the pixel;

generate spectral data for the events in the event stream using a demodulation and frequency transform to convert temporospatial aggregates of events in the event stream to frequency domain data that corresponds to an optical spectrum; and generate a hyperspectral video stream of hyperspectral image frames using the spectral data to reconstruct an input scene in a spectral range.

19. The non-transitory machine readable storage medium in claim 18, further comprising instructions, that when executed by the at least one processor, group the events in the event stream into a plurality of event bins.

20. The non-transitory machine readable storage medium in claim 19, further comprising instructions, that when executed by the at least one processor, determine frequency domain data for the events in the event bins using a demodulation and frequency transform technique.

21. The non-transitory machine readable storage medium in claim 19, wherein the demodulation and frequency transform technique includes performing a Non-uniform Discrete Cosine Transform (NDCT).

22. The non-transitory machine readable storage medium in claim 18, wherein the interferometer is implemented using a translating wedge based identical pulses encoding system (TWINS) having a configurable sweep actuation mechanism.

23. The non-transitory machine readable storage medium in claim 22, wherein the configurable sweep actuation mechanism is parametrically controlled by a modulation control input to emphasize or deemphasize certain spectral bands.

24. The non-transitory machine readable storage medium in claim 22, wherein a sweep rate of the interferometer is greater than a rate of change of the input scene.

25. The non-transitory machine readable storage medium in claim 19, further comprising instructions, that when executed by the at least one processor, perform spectral calibration of the spectral data using a calibration source of a known wavelength, wherein the calibration source is input to the interferometer and provided in the light output to the event camera.

* * * * *